(12) United States Patent
Sagesaka et al.

(10) Patent No.: US 10,816,160 B2
(45) Date of Patent: Oct. 27, 2020

(54) VEHICLE LAMP

(71) Applicant: Koito Manufacturing Co., Ltd., Tokyo (JP)

(72) Inventors: Yuji Sagesaka, Shizuoka (JP); Masakazu Sato, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/785,861

(22) Filed: Feb. 10, 2020

(65) Prior Publication Data

US 2020/0263851 A1 Aug. 20, 2020

(30) Foreign Application Priority Data

Feb. 18, 2019 (JP) ................................. 2019-026219

(51) Int. Cl.
*F21S 43/20* (2018.01)
*F21S 43/27* (2018.01)

(52) U.S. Cl.
CPC .............. *F21S 43/26* (2018.01); *F21S 43/27* (2018.01)

(58) Field of Classification Search
CPC .................................. F21S 43/26; F21S 43/27
USPC ........................................................ 362/546
See application file for complete search history.

(56) References Cited

U.S. PATENT DOCUMENTS

| 6,017,141 A * | 1/2000 | Sugiyama | B29C 65/0618 362/520 |
| 6,054,072 A * | 4/2000 | Bentley | B29C 65/1412 264/1.9 |
| 6,270,242 B1 * | 8/2001 | Suzuki | B60Q 1/0466 362/546 |
| 6,592,239 B1 * | 7/2003 | Akiyama | B29C 65/1638 362/267 |
| 7,175,325 B2 * | 2/2007 | Otani | B29C 65/1635 362/549 |
| 7,329,025 B2 * | 2/2008 | Yasuda | B23K 26/18 362/259 |
| 7,815,354 B2 * | 10/2010 | Yamazaki | B29C 65/1635 362/546 |
| 2001/0028567 A1 * | 10/2001 | Akiyama | B29C 66/12469 362/520 |
| 2001/0028568 A1 * | 10/2001 | Akiyama | F21V 17/101 362/520 |

(Continued)

FOREIGN PATENT DOCUMENTS

JP 2017-189887 A 10/2017

*Primary Examiner* — Bryon T Gyllstrom
(74) *Attorney, Agent, or Firm* — Abelman, Frayne & Schwab

(57) ABSTRACT

A vehicle lamp includes a lamp housing having an inner space and a welding surface, and a cover disposed adjacent to another vehicle lamp, and configured to cover the inner space and join to the lamp housing by laser welding. The cover includes a design surface in which an outer surface of an outer peripheral portion is formed as a curved surface and a welding leg that protrudes from a portion near the outer peripheral portion in the design surface. An annular portion on an inner peripheral side of the curved surface on an outer surface of the design surface is formed as a laser light incident surface. The curved surface is positioned on an outer peripheral side from an intersection point of a virtual line and the outer surface of the design.

8 Claims, 5 Drawing Sheets

(56) References Cited

U.S. PATENT DOCUMENTS

| | | | |
|---|---|---|---|
| 2006/0133086 A1* | 6/2006 | Bouteiller | B29C 66/12441 |
| | | | 362/268 |
| 2011/0203726 A1* | 8/2011 | Zaitsu | B29C 65/1635 |
| | | | 156/272.8 |
| 2012/0026747 A1* | 2/2012 | Hayashi | F21S 43/14 |
| | | | 362/520 |
| 2013/0242587 A1* | 9/2013 | Hirabayashi | B29D 11/0074 |
| | | | 362/509 |

* cited by examiner

VEHICLE LAMP

CROSS-REFERENCE TO RELATED APPLICATIONS

This application is based on and claims priority from Japanese Patent Application No. 2019-026219, filed on Feb. 18, 2019, with the Japan Patent Office, the disclosure of which is incorporated herein in its entirety by reference.

TECHNICAL FIELD

The present disclosure relates to a technical field of a vehicle lamp in which a cover is joined to the lamp housing by laser welding.

BACKGROUND

An example of a vehicle lamp such as a tail lamp includes a so-called seamless type vehicle lamp, in which a pair of vehicle lamps is respectively disposed at a non-movable part and a movable part of a vehicle, and integrally recognized as if to be a single vehicle lamp in a state of being positioned adjacent to each other. For example, one vehicle lamp is disposed at a body of a vehicle that is the non-movable part, and the other vehicle lamp is disposed at a trunk lid that is the movable part, and the one vehicle lamp and the other vehicle lamp are disposed adjacent to each other in a state where the trunk lid is closed.

In such a seamless type vehicle lamp, in addition to a design surface having an outer surface that faces the outside of the vehicle, welding legs that are disposed opposite to each other and capable of transmitting light are provided in each of the one vehicle lamp and the other vehicle lamp. See, e.g., Japanese Patent Laid-Open Publication No. 2017-189887. The welding leg is described as a "leg wall" in Japanese Patent Laid-Open Publication No. 2017-189887. The welding leg is provided to be protruded from an end portion on the adjacent vehicle lamp side of the outer peripheral portion of the design surface or a portion near the end portion. The welding leg is welded to the lamp housing by, for example, laser welding, and thus, a cover is joined to the lamp housing.

In the seamless type vehicle lamp, for example, when light is emitted from a light source of the one vehicle lamp, the emitted light is transmitted to the design surface of the cover of the one vehicle lamp and irradiated outward, and is transmitted to the two welding legs facing each other and incident to the other vehicle lamp. The light incident to the other vehicle lamp is transmitted to the design surface of the cover of the other vehicle lamp, and irradiated outward. Therefore, both of the vehicle lamps are integrally recognized as if they are one vehicle lamp.

SUMMARY

However, the outer peripheral portion of the cover of the vehicle lamp is chamfered into a curved surface so as to be able to secure safety even if it is touched by a human hand.

Meanwhile, the protruding direction from the design surface of the welding leg is determined by the design of the vehicle lamp, and is in various directions. Therefore, although the irradiation direction of the laser light during the laser welding is determined by the protruding direction of the welding leg from the design surface, depending on the irradiation direction or the incident position of the laser light, refraction occurs when the laser light is incident onto the design surface, and the intensity of the laser light irradiated on the welding surface is biased. As a result, a portion that is not sufficiently welded may be generated or the resin may be decomposed due to excessive laser light irradiation.

As described above, in the case where the outer peripheral portion of the cover is formed in a curved shape, when laser light is irradiated on the curved shape portion, the laser light is refracted in various directions on the curved surface so that the intensity of the laser light irradiated on the welding surface is likely to be biased, and trouble is likely caused in joining the cover to the lamp housing.

Therefore, a vehicle lamp of the present disclosure is to secure a good joined state of a cover with respect to a lamp housing.

Firstly, the vehicle lamp according to the present disclosure includes: a lamp housing having an inner space and a welding surface, and a cover disposed adjacent to another vehicle lamp, and configured to cover the inner space and join to the lamp housing by laser welding. The cover includes a design surface in which an outer surface of an outer peripheral portion is formed as a curved surface, and a welding leg protruding from a portion near the outer peripheral portion in the design surface and having a tip surface formed as a welding target surface that is joined to the welding surface. An annular portion on an inner peripheral side of the curved surface on an outer surface of the design surface is formed as a laser light incident surface. The curved surface is positioned on an outer peripheral side from an intersection point of a virtual line and the outer surface of the design surface, the virtual line passing through an outer end of the welding target surface on an another vehicle lamp side and being parallel to a protruding direction from the design surface of the welding leg.

Therefore, in the laser light irradiated to the outer surface of the design surface, the laser light is not incident from the curved surface, and the entire laser light reaches the welding surface without being refracted partially at a large angle.

Secondly, in the vehicle lamp according to the present disclosure, the welding target surface may be parallel to the laser light incident surface.

Therefore, a transmission distance of the laser light from the incident surface to the welding target surface is kept constant at any position of the light flux of the laser light.

Thirdly, in the vehicle lamp according to the present disclosure, the welding target surface may be perpendicular to a pressing direction of the cover against the lamp housing.

Therefore, a force in the pressing direction of the cover against the lamp housing is efficiently applied to the welding surface.

Fourthly, in the vehicle lamp according to the present disclosure, a portion of the design surface between the intersection point and the curved surface may be formed on a plane facing a same direction as the laser light incident surface.

Therefore, the laser light is hardly incident from the curved surface even in a case where, depending on the processing accuracy, the positional accuracy of the curved surface with respect to the outer surface is lowered or the laser light irradiation position is displaced.

According to the present disclosure, in the laser light irradiated to the outer surface of the design surface, the laser light is not incident from the curved surface, and the entire laser light reaches the welding surface without being refracted partially at a large angle, and thus, it is possible to secure a good joined state of the cover with respect to the lamp housing.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

In the embodiment described below, a vehicle lamp of the present disclosure is applied to a combination lamp having a tail lamp function. The present disclosure may be widely applied to various vehicle lamps such as a turn signal lamp, a clearance lamp, a stop lamp, a daytime running lamp, a cornering lamp, a hazard lamp, a position lamp, a back lamp, or a combination lamp which is a combination thereof.

In the descriptions below, the front-rear, upward-downward, and left-right directions are illustrated with the irradiation direction of the light from the light source to the outside of the light as the rear. The front-rear, upward-downward, and left-right directions illustrated in the following are for convenience of explanation, and the implementation of the present disclosure is not limited to these directions.

<Schematic Configuration of Vehicle>

Figure 1:
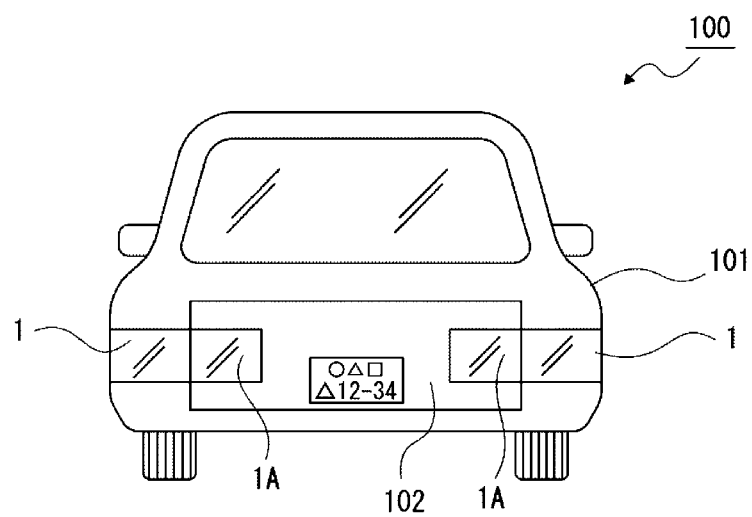
FIG. 1 illustrates an embodiment of a vehicle lamp of the present disclosure together with FIGS. 2 to 6, and is a rear view illustrating a state where the vehicle lamp is disposed at a vehicle.

First, a schematic configuration of a vehicle relating to an arrangement state of a vehicle lamp will be described (see FIG. 1).

Vehicle lamps 1 and 1 are disposed, for example, to be attached to both left and right end portions of a vehicle 100, respectively. A vehicle lamp 1 is disposed at, for example, a non-movable part such as a body 101 of a vehicle 100.

Other vehicle lamps 1A and 1A are disposed at both left and right end portions of a trunk lid 102 that is a movable part, and the vehicle lamps 1A and 1A are positioned adjacent to inner sides of the vehicle lamps 1 and 1, respectively, in a state where the trunk lid 102 is closed.

The vehicle lamp 1 is provided as, for example, a combination lamp having functions of a stop lamp and a turn signal lamp in addition to a function of a tail lamp, and the vehicle lamp 1A is provided as, for example, a combination lamp having a function of a backup lamp in addition to a function of a tail lamp.

In the above, although the example in which the vehicle lamp 1 is disposed at the non-movable part such as the body 101 of the vehicle 100, and the vehicle lamp 1A is disposed at the movable part such as trunk lid 102 is described, on the contrary, the vehicle lamp 1 may disposed at the movable part such as the trunk lid 102, and the vehicle lamp 1A may be disposed at the non-movable part such as the body 101 of the vehicle 100.

<Configuration of Vehicle Lamp>

Subsequently, a form for implementing the vehicle lamp according to the present disclosure will be described.

Figure 2:
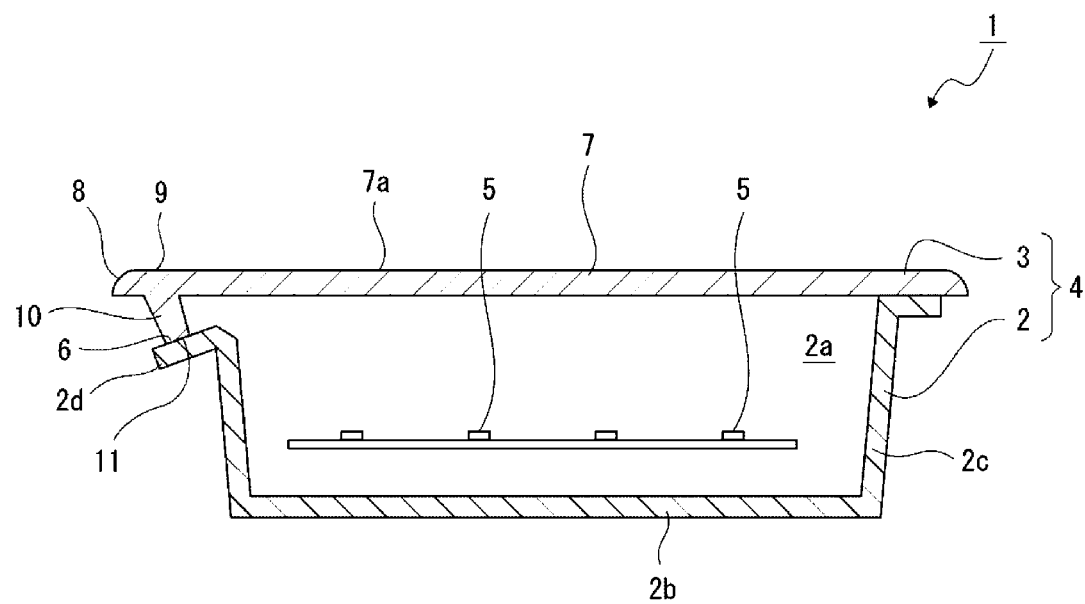
FIG. 2 is a cross-sectional view of the vehicle lamp.

The vehicle lamp 1 includes, for example, a lamp housing 2 that is opened rearward and a cover 3 that closes an inner space 2a of the lamp housing 2 (see FIG. 2). A lamp outer case 4 is constituted by the lamp housing 2 and the cover 3.

In addition to light sources 5, 5, that emit light, for example, a light guide (not illustrated) that guides the light emitted from the light sources to a predetermined direction is disposed inside the lamp outer case 4. As a light source 5, for example, a light emitting diode (LED) is used. Only one light source 5 may be disposed.

The lamp housing 2 is made of an opaque resin material, and includes, for example, a base surface 2b facing substantially the front-rear direction, a circumferential surface 2c protruding substantially rearward from an outer peripheral portion of the base surface 2b, and an annular portion 2d protruding outward from a rear end portion of the circumferential surface 2c and formed in a flange shape.

A portion of the annular portion 2d positioned on the adjacent vehicle lamp 1A is inclined to be displaced forward as it goes outward. The rear surface of the annular portion 2d is formed as a welding surface 6.

The cover 3 is made of a transparent resin material, and is formed by integrally forming a design surface 7 formed in a flat plate shape, and a welding leg 10 protruding from a portion near an outer periphery of the design surface 7.

An outer surface 7a of the design surface 7 is formed as a curved surface 8 whose outer peripheral portion is convex outward, and an annular portion on an inner peripheral side of the curved surface 8 is formed as an incident surface 9 for laser light B. The incident surface 9 is formed in a plane shape facing substantially rearward.

The welding leg 10 protrudes in a direction displaced to a side direction as it goes forward, from at least a portion of the design surface 7 on the adjacent vehicle lamp 1A side.

A tip surface of the welding leg 10 is formed as a welding target surface 11 that is joined to the welding surface 6 by laser welding. The welding target surface 11 is perpendicular to the protruding direction of the welding leg 10, and a width of the welding target surface 11 is configured to be smaller than a width of the welding surface 6.

Figure 3:
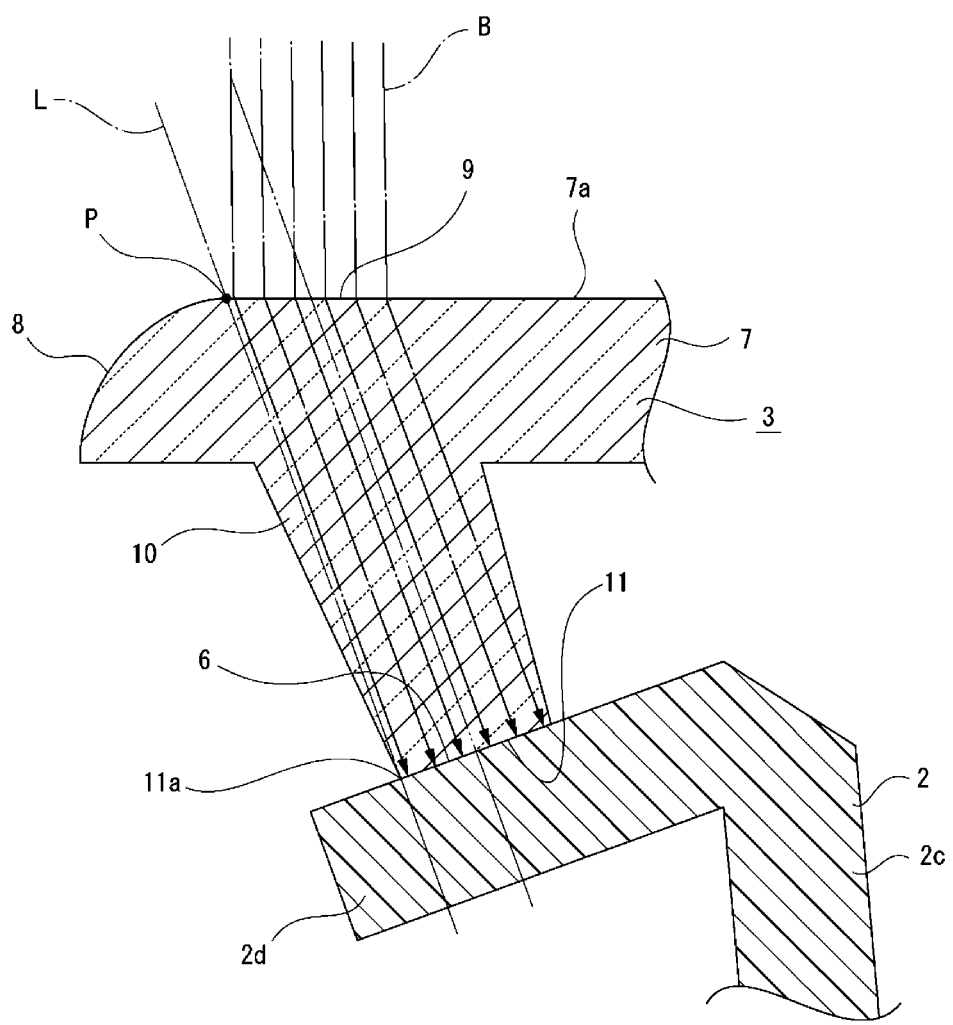
FIG. 3 is an enlarged cross-sectional view illustrating a welding portion of a welding leg.

In the vehicle lamp 1 configured as described above, when an intersection point P is assumed that a point where a virtual line L that passes through an outer end 11a of the welding target surface 11 on the adjacent vehicle lamp 1A side and is parallel to the protruding direction of the welding leg 10 intersects with the outer surface 7a of the design surface 7, the curved surface 8 is positioned on an outer peripheral side from the intersection point P (see FIG. 3).

In the vehicle lamp 1 configured as described above, the cover 3 is joined to the lamp housing 2 by the laser welding. Joining of the cover 3 to the lamp housing 2 by the laser welding is performed by irradiating the laser light B toward the incident surface 9.

As a method of the welding of the cover 3 to the lamp housing 2, for example, a scanning method is used for irradiating the welding leg 10 with the laser light B, and a galvano method is used for irradiating the other portion with the laser light B. The scanning method or the galvano method may be used for irradiation of the laser beam B to all portions.

The laser light B incident from the incident surface 9 is transmitted through the design surface 7 or the design surface 7 and the welding leg 10, and reaches the welding surface 6 of the lamp housing 2. When the laser light B reaches the welding surface 6, the inner surface of the design surface 7 or the welding target surface 9 and the welding surface 6 are melted, and the cover 3 is joined to the lamp housing 2.

In the outer peripheral portion of the cover 3 on the adjacent vehicle lamp 1A side, in order to secure the high intensity of the light by allowing the entire light flux to reach the welding surface 6, the laser light B is irradiated toward the cover 3 from a direction in consideration of refraction at the incident surface 9 such that the center of the light flux reaches the center of the welding target surface 11 in the width direction. The refraction direction of the laser light B may be coincide with the protruding direction of the welding leg 10.

However, in the vehicle lamp 1, since the curved surface 8 is positioned on the outer peripheral side from the intersection point P, the laser light B is not incident from the curved surface 8, and the entire laser light B reaches the welding surface 6 without causing the laser light B to be refracted partially at a large angle.

Therefore, the laser light B reaches the welding surface 6 without being deviated while securing a sufficient strength, and thus, it is possible to secure a good joined state of the cover 3 with respect to the lamp housing 2.

Figure 4:
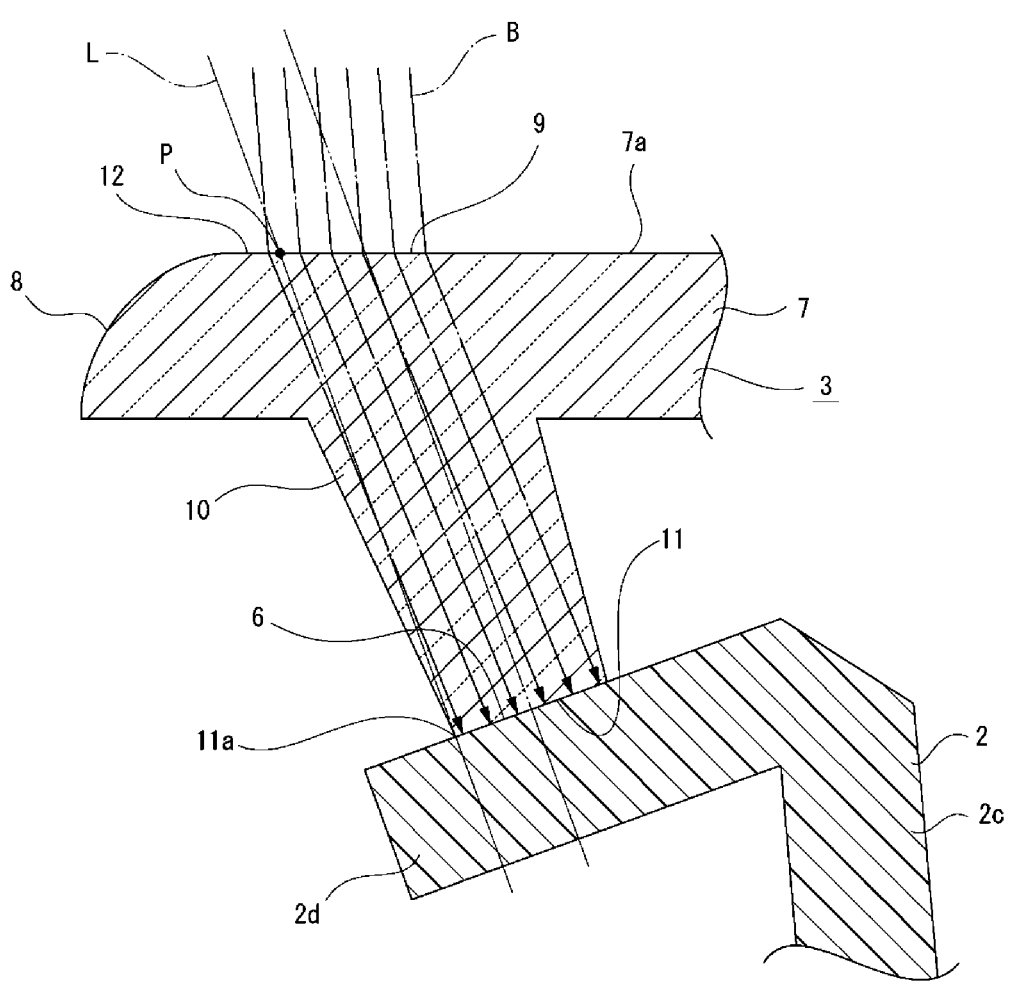
FIG. 4 is an enlarged cross-sectional view illustrating an example in which a plane is provided on an outer surface of a design surface.

The portion of the design surface 7 between the curved surface 8 of the outer surface 7a and the intersection point P may be formed as a plane 12 facing the same direction as the incident surface (see FIG. 4).

Therefore, even in a case where, depending on the processing accuracy, the positional accuracy of the curved surface 8 with respect to the outer surface 7a is lowered or the laser light B irradiation position is displaced, the laser light B is hardly incident from the curved surface 8, and thus, it is possible to secure high irradiation accuracy of the laser light B with respect to the welding surface 6.

Figure 5:
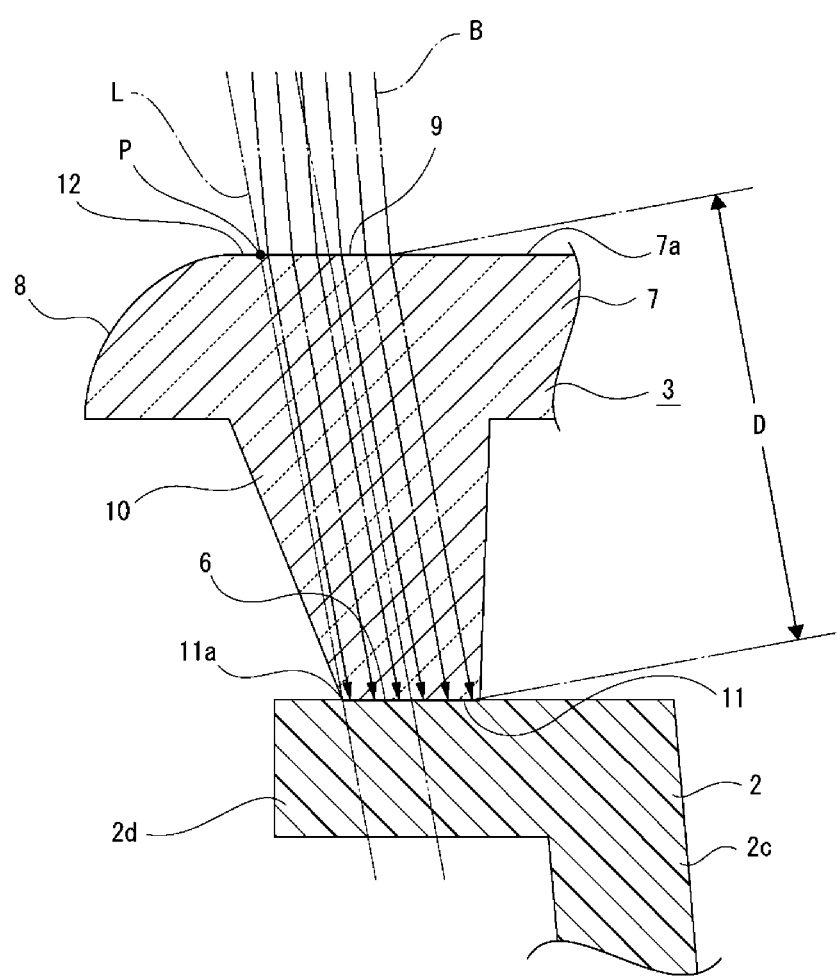
FIG. 5 is an enlarged cross-sectional view illustrating an example in which a welding target surface is parallel to the design surface.

Further, the welding target surface 11 may be configured to be in parallel with the incident surface 9 (see FIG. 5).

Therefore, a transmission distance D of the laser light B from the incident surface 9 to the welding target surface 11 is kept constant at any position of the light flux of the laser light B, and thus, difference in attenuation of the laser light B due to the difference in the transmission distance D is unlikely to occur, and the intensity of the laser light B that reaches the welding surface 6 is not likely deviated.

Therefore, the intensity of the laser light B that reaches the welding target surface 11 becomes more uniform, and a better joined state of the cover 3 with respect to the lamp housing 2 may be secured.

Figure 6:
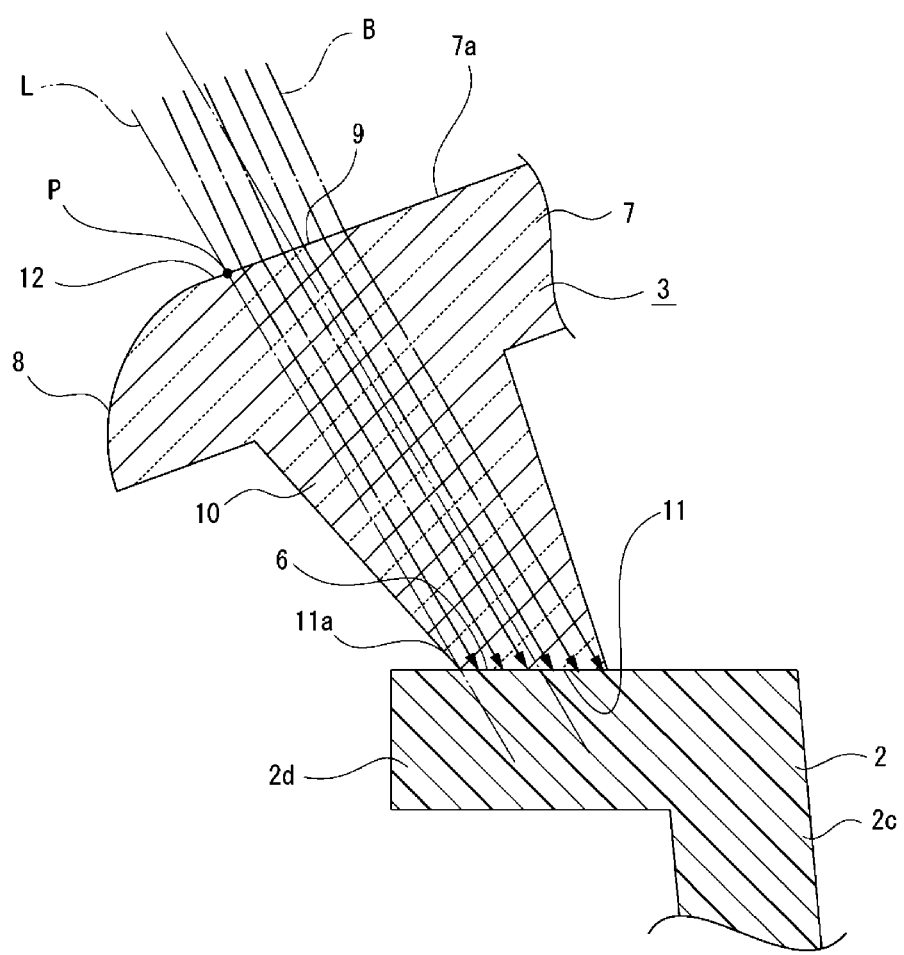
FIG. 6 is an enlarged cross-sectional view illustrating an example in which a welding target surface is perpendicular to a pressing direction of a cover against a lamp housing.

Further, during the laser welding operation, the laser light B is irradiated in a state where the cover 3 is pressed against the lamp housing 2, but the welding target surface 11 may be perpendicular to the pressing direction of the cover 3 against the lamp housing 2 (see FIG. 6).

Therefore, since the force in the pressing direction of the cover 3 against the lamp housing 2 is efficiently applied to the welding surface 6, the welding target surface 11 comes into surface-contact with the welding surface 6 in a stable state, and the cover 3 may be reliably joined to the lamp housing 2.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising:
    a lamp housing having an inner space and a welding surface; and
    a cover disposed adjacent to another vehicle lamp, and configured to cover the inner space and join to the lamp housing by laser welding,
    wherein the cover includes a design surface in which an outer surface of an outer peripheral portion is formed as a curved surface, and a welding leg protruding from a portion near the outer peripheral portion in the design surface and having a tip surface formed as a welding target surface that is joined to the welding surface,
    an annular portion on an inner peripheral side of the curved surface on an outer surface of the design surface is formed as a laser light incident surface, and
    the curved surface is positioned on an outer peripheral side from an intersection point of a virtual line and the outer surface of the design surface, the virtual line passing through an outer end of the welding target surface on an another vehicle lamp side and being parallel to a protruding direction from the design surface of the welding leg.

2. The vehicle lamp according to claim 1, wherein the welding target surface is parallel to the laser light incident surface.

3. The vehicle lamp according to claim 1, wherein the welding target surface is perpendicular to a pressing direction of the cover against the lamp housing.

4. The vehicle lamp according to claim 2, wherein the welding target surface is perpendicular to a pressing direction of the cover against the lamp housing.

5. The vehicle lamp according to claim 1, wherein a portion of the design surface between the intersection point and the curved surface is formed on a plane facing a same direction as the laser light incident surface.

6. The vehicle lamp according to claim 2, wherein a portion of the design surface between the intersection point and the curved surface is formed on a plane facing a same direction as the laser light incident surface.

7. The vehicle lamp according to claim 3, wherein a portion of the design surface between the intersection point and the curved surface is formed on a plane facing a same direction as the laser light incident surface.

8. The vehicle lamp according to claim 4, wherein a portion of the design surface between the intersection point and the curved surface is formed on a plane facing a same direction as the laser light incident surface.

* * * * *